United States Patent [19]
Bennett

[11] 3,936,080
[45] Feb. 3, 1976

[54] PIPELINE EXPANSION JOINT HAVING A SMOOTH BORE

[75] Inventor: David W. Bennett, Willowdale, Canada

[73] Assignee: Grandview Industries Limited, Rexdale, Canada

[22] Filed: May 30, 1974

[21] Appl. No.: 474,768

[30] Foreign Application Priority Data
June 8, 1973  Canada .................................. 173572

[52] U.S. Cl. ................................ 285/175; 285/302
[51] Int. Cl.² ............................................ F16L 55/00
[58] Field of Search ............ 285/302, 175, 374, 399, 285/370, 397

[56] References Cited
UNITED STATES PATENTS

| | | | |
|---|---|---|---|
| 1,013,258 | 1/1972 | Wyton | 285/302 |
| 1,810,091 | 6/1931 | Siegle | 285/374 X |
| 3,353,563 | 11/1967 | Hutton | 285/374 X |
| 3,427,051 | 2/1969 | White et al. | 285/302 X |
| 3,645,563 | 2/1972 | Rochelle | 285/302 X |

Primary Examiner—Dave W. Arola
Attorney, Agent, or Firm—Fleit & Jacobson

[57] ABSTRACT

A pipeline expansion joint having a smooth bore, for use with pipelines into which flow slurries containing solids in suspension, comprises a first sleeve open at both ends and having a tapered portion formed in the inner wall of one of its ends extending at a small angle with the axis of the first sleeve and over a substantial portion of the length of the first sleeve from its inside diameter to substantially its outside diameter, and a second sleeve also open at both ends and having a first portion of substantially the same inner diameter as the outer diameter of the first sleeve and telescopically mounted on the above-mentioned one end of the first sleeve, a second portion of the same diameter as the first sleeve, and an intermediate portion expanded at a small angle with the axis of the second sleeve over a substantial portion of its length from the second to the first portion of such second sleeve. The above expansion joint has a smooth bore throughout with no area of abrupt changes in order to prevent turbulence and the resulting wear due to the solids in suspension in the slurries.

7 Claims, 7 Drawing Figures

PIPELINE EXPANSION JOINT HAVING A SMOOTH BORE

This invention relates to a pipeline expansion joint having a smooth bore for use more particularly with pipelines into which flow slurries containing solids in liquid suspension.

The expansion joints available on the market consist of rubber bellows or of telescopically mounted sleeves sealed by O rings or similar sealing methods. These joints all present abrupt diameter changes located either in the annular cavities of the bellow portion of the joints or at the junction of the sleeves for the joints using telescopically mounted sleeves. Such abrupt changes in diameter create turbulence which causes wear of the expansion joint within a short period of time. It will be appreciated that the solid material in suspension acts as a grinding wheel which soon punctures the joint.

It is therefore the object of the present invention to provide an expansion joint having a smooth bore throughout with no area of abrupt changes so as to prevent turbulence.

The expansion joint, in accordance with the invention, comprises a first sleeve open at both ends and having a tapered portion formed in the inner wall of one of its ends extending at a small angle with the axis of the sleeve and over a substantial portion of its length from its inside diameter to substantially its outside diameter, and a second sleeve having a first portion of substantially the same inner diameter as the outer diameter of the first sleeve and telescopically mounted on the above-mentioned one end of the first sleeve, a second portion of the same diameter as the first sleeve, and an intermediate portion expanded at a small angle with the axis of the second sleeve over a substantial portion of its length from such second portion to the first portion of the second sleeve.

The annular expansion of the second sleeve may be substantially equal to the angular taper of the first sleeve. Such angular expansion and taper may vary from 1° to 30° depending on the expansion joint diameter, but preferably from 1° to 15°.

In order to seal the expansion joint, at least one annular groove may be formed in the inner wall of the first portion of the second sleeve and an O ring mounted within such groove and in contact with the outer wall of the first sleeve.

There must not be any abrupt changes in the connection of the expansion joint to the adjacent pipes and any type of joints may be used for that purpose.

The invention will now be disclosed, by way of example, with reference to a preferred embodiment thereof illustrated in the accompanying drawings in which.

Figure 1:
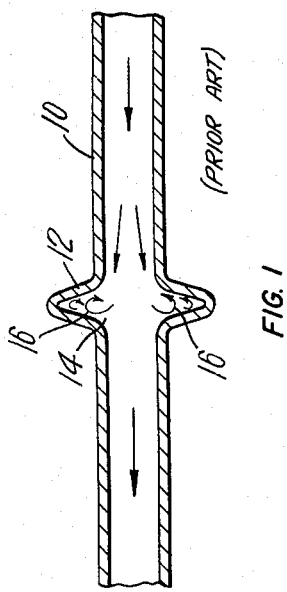
FIG. 1 illustrates a known expansion joint of the bellow type.

Referring to FIG. 1, there is shown a well known rubber joint 10 having a bellow portion 12 which absorbs the variations in the length of the line due to temperature changes. It will be understood that such variations may be appreciable when the pipeline is made of thermoplastic material. The bellow portion 12 forms a cavity 14 wherein turbulation is created as indicated by the arrows 16. When the liquid flowing in the pipe carries solids in suspension, such as slurries, the solids in suspension cause quick wear of the expansion joint at point 12. Indeed, the solids in suspension act as a grinding wheel which soon punctures the expansion joint.

Figure 2:
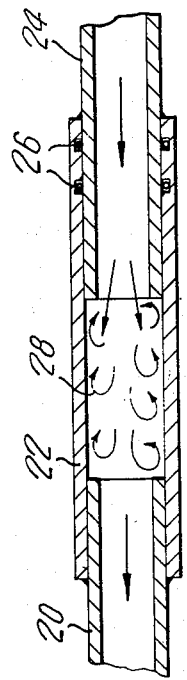
FIG. 2 illustrates a known expansion joint made of telescopically mounted sleeves.

Another known expansion joint is shown in FIG. 2 of the drawings and consists of a first sleeve 20 having an outer sleeve 22 welded or glued thereto depending as to whether the joint is made of metal or thermoplastic material. Another sleeve 24 of the same diameter as sleeve 20 is telescopically mounted within outer sleeve 22 and so absorbs the variations in the length of the line due to temperature variations. The outer sleeve is provided with at least one groove 26 wherein an O ring or similar seal is located for sealing the sleeves 22 and 24. The above joint also presents abrupt changes in diameter which cause turbulence as indicated by arrows 28. This type of expansion joint is thus also subject to wear and would not be suitable.

Figure 3:
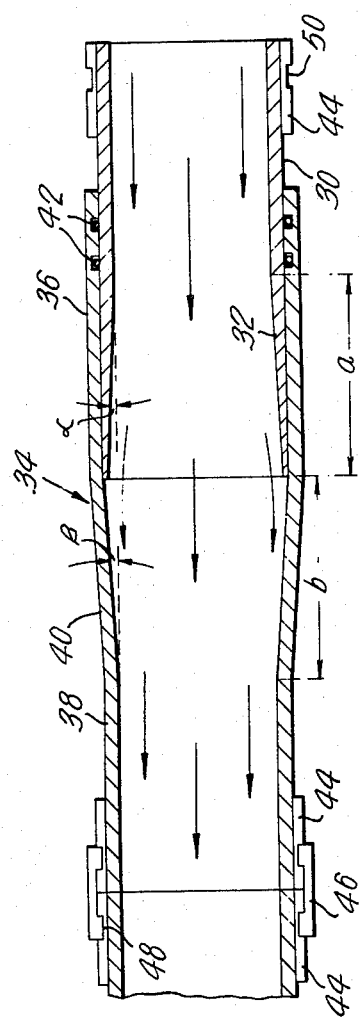
FIG. 3 illustrates an expansion joint in accordance with the invention.

Referring now to FIG. 3, there is shown an expansion joint in accordance with the invention. The joint includes a first sleeve 30 having a tapered portion 32 formed in the inner wall of one of its ends and extending at a small angle $\alpha$ with the axis of sleeve 30 over a substantial portion $a$ of its length from its inside diameter to substantially its outside diameter, and a second sleeve 34 provided with a first portion 36 which is telescopically mounted on the first sleeve 30, a second portion 38 which is of the same nominal diameter as the first sleeve 30 and an intermediate portion 40 extending at an angle $\beta$ with the axis of sleeve 34 over a substantial portion $b$ of its length from the second portion 38 to the first portion 36 of the second sleeve 34. Preferably, the angular taper $\alpha$ is identical to the angular expansion $\beta$ and, consequently, the lengths $a$ and $b$ are the same. With pipes varying in diameter from 3 to 6 inches such angles $\alpha$ or $\beta$ may vary between 1 and 30 degrees but preferably between 1° and 15°. It will be appreciated that this expansion joint has a smooth bore throughout and that practically no turbulence will be created as there are no abrupt changes in the diameter of the joint. A joint as disclosed above has been placed under experimental testing and showed no appreciable wear after more than three quarters million tons of slurry had passed through.

The second sleeve 34 is provided with at least one angular groove 42 wherein is located an O ring for sealing the space between the two sleeves 30 and 34. It will be understood that the groove may be located in the inner sleeve 30 instead of being placed in the outer sleeve portion 36. It will also be understood that any other type of seals may be used.

The expansion joint may be joined to adjacent pipes of the same diameter by means of any known adapters but it is important that there be no abrupt changes in the diameter from the joint to the pipe so as to prevent turbulence. One known adapter consists of annular sleeves 44 which are welded or glued to the end of the pipe adjacent to the joint and to the end of the joint itself. A clip 46 having inward projections 48 adapted to fit into grooves 50 of the sleeves 44 are used to secure the expansion joint to the end of the pipe. It will be understood that a similar arrangement is used at the other end of the expansion joint to connect it to the following pipe.

Figure 4:
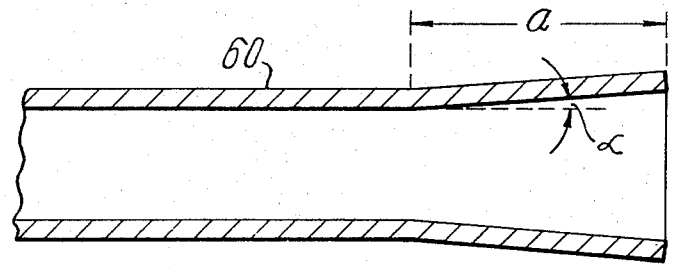
FIGS. 4–7 illustrate a method of making the expansion joint of FIG. 3.
Figure 5:
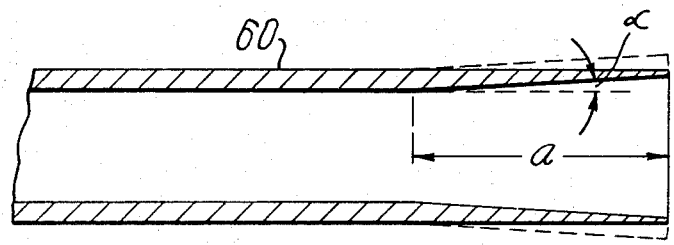
Figure 6:
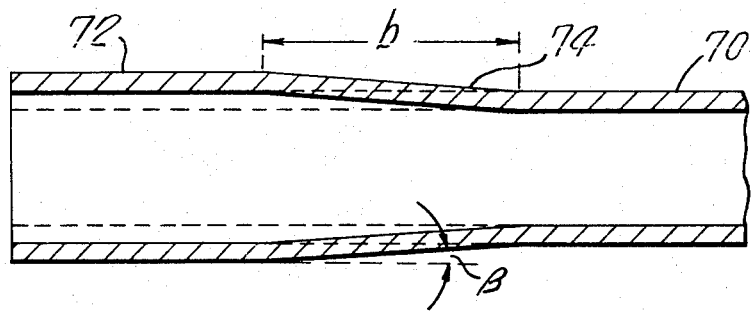

One method of manufacturing a smooth flow expansion joint using thermoplastic material would be to expand a sleeve 60 of thermoplastic material by an angle α over a length a as illustrated in FIG. 4 of the drawings. The outside wall of the sleeve 60 is then machined off to give constant outside diameter as illustrated in FIG. 5 of the drawings so as to form the tapered portion 32 illustrated in FIG. 3. It will be understood that the angular taper α must be small so as to provide a smooth change in the diameter of the sleeve 60.

Figure 7:
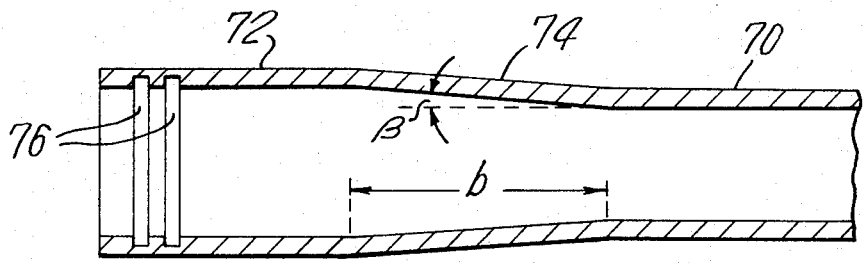

As illustrated in FIG. 7, a second sleeve 70 of the same diameter as sleeve 60 is then expanded using a suitable die to form the portion 72 adapted to telescopically slide over inner sleeve 60 and an intermediate portion 74 which is expanded by an angle β over a length b of the sleeve 70. The angular grooves 76 are then machined into the end of the expanded portion 72 of the sleeve so as to permit to insert O rings therein as illustrated in FIG. 7.

The above disclosed method is particularly suitable for manufacturing expansion joints using thermoplastic materials. Other materials such as metal may require total machining or molding.

Although the invention has been disclosed with reference to a preferred embodiment thereof, it is to be understood that the invention is not to be limited to such embodiment but by the claims only. For example, the angular expansion of the outer sleeve need not be equal to the angular taper of the inner sleeve. However, such angular expansion and taper must provide a smooth change in the diameter of the expansion joint to prevent turbulence. Also, the seal between the inner sleeve and the expanded portion of the outer sleeve may vary. Furthermore, any type of line joints may be used for connecting the expansion joint to the pipe provided that there is no abrupt change from the expansion joint to the pipe which would cause turbulence.

What is claimed is:

1. A pipeline expansion joint having a smooth bore for use with pipelines into which flow slurries containing solids in suspension comprising:
   a. a first sleeve open at both ends and having a tapered portion formed in the inner wall of one of its ends extending at a small angle with the axis of the first sleeve and over a substantial portion of its length from its inside diameter to substantially its outside diameter; and
   b. a second sleeve also open at both ends and having a first portion of substantially the same inner diameter as the outer diameter of said first sleeve and telescopically mounted on said one end of the first sleeve, a second portion of substantially the same inside diameter as that of said first sleeve, and an intermediate portion expanded at a small angle with the axis of the second sleeve over a substantial portion of its length from said second portion to said first portion of the second sleeve, thereby providing a smooth bore throughout the expansion joint with no area of abrupt changes in order to prevent turbulence and the resulting wear of the expansion joint by the solids in suspension in the slurries; and
   wherein the small angle of taper in said first sleeve is substantially the same as the small angle of expansion in said second sleeve.

2. A pipeline expansion joint as defined in claim 1, wherein said angular expansion and taper varies from 1° to 30° depending on the expansion joint diameter.

3. A pipeline expansion joint as defined in claim 1, wherein said angular expansion and taper varies from 1° to 15°.

4. A pipeline expansion joint as defined in claim 1, further comprising at least one annular groove formed in the inner wall of the first portion of said second sleeve and an O ring mounted within said groove and in contact with the outer wall of said first sleeve so as to perfectly seal the expansion joint.

5. A pipeline expansion joint as defined in claim 1, further comprising line joint adapters mounted on both ends of said expansion joint for joining the end of the expansion joint to a line having the same diameter as the expansion joint.

6. A pipeline expansion joint as defined in claim 1, wherein the angular taper of the first sleeve and the angular expansion of the second sleeve are adjacent one another and are oppositely directed.

7. For use with pipelines into which flow slurries containing solids in suspension, a pipeline expansion joint having a smooth bore on the interior thereof, and comprising:
   an inlet for introducing slurries containing abrasive solids in suspension, to the interior of said expansion joint;
   an outlet for expelling said slurries from the interior of said expansion joint;
   a first sleve open at both ends and having a smoothly tapering portion formed in the inner wall of one of its ends, the taper gradually extending at a first small angle with the axis of the first sleeve and over a substantial portion of its length from its inside diameter to substantially its outside diameter; and
   a second sleeve also open at both ends and having a first enlarged portion of substantially the same inner diameter as the outer diameter of said first sleeve and telescopically mounted on said one end of the first sleeve, a second portion of substantially the same inside diameter as that of said first sleeve, and an elongated intermediate portion gradually expanding at a second small angle with the axis of the second sleeve over a substantial portion of its length from said second portion to said first portion of the second sleeve, the interior of said expansion joint between said inlet and said outlet thereby comprising a smooth bore throughout, with no area of abrupt changes thereby preventing turbulence of said slurries in the interior of said expansion joint and wear of the expansion joint from turbulent solids in suspension in the slurries; and wherein said first small angle is substantially the same as said second small angle.

* * * * *